No. 807,749. PATENTED DEC. 19, 1905.
R. G. LEDIG.
SEAT FOR VELOCIPEDES, &c.
APPLICATION FILED DEC. 17, 1903.
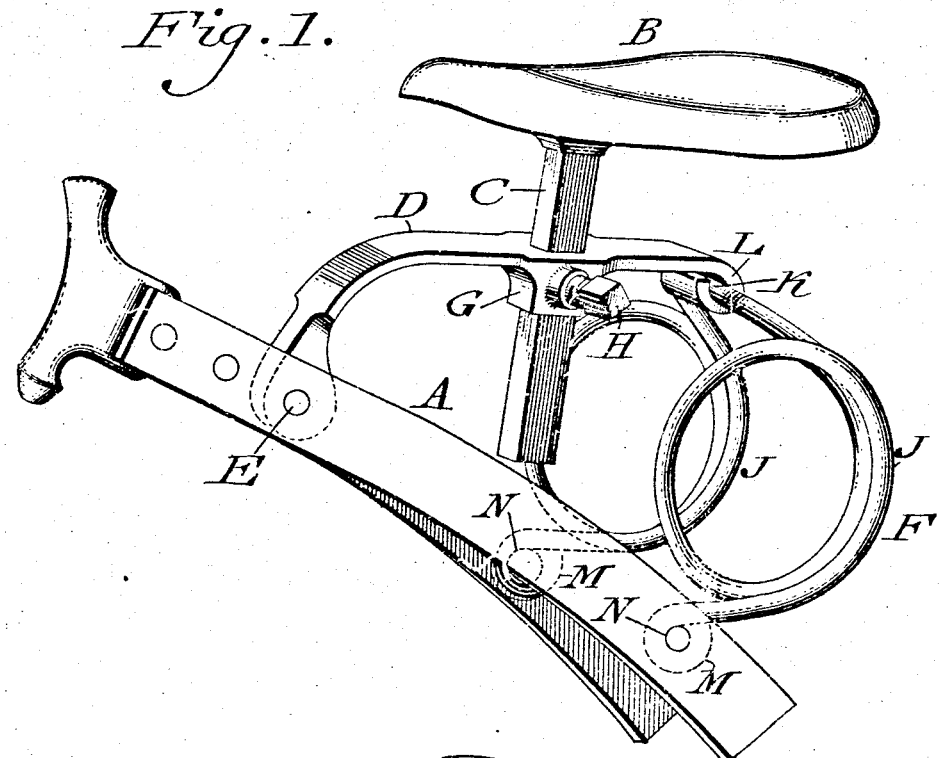
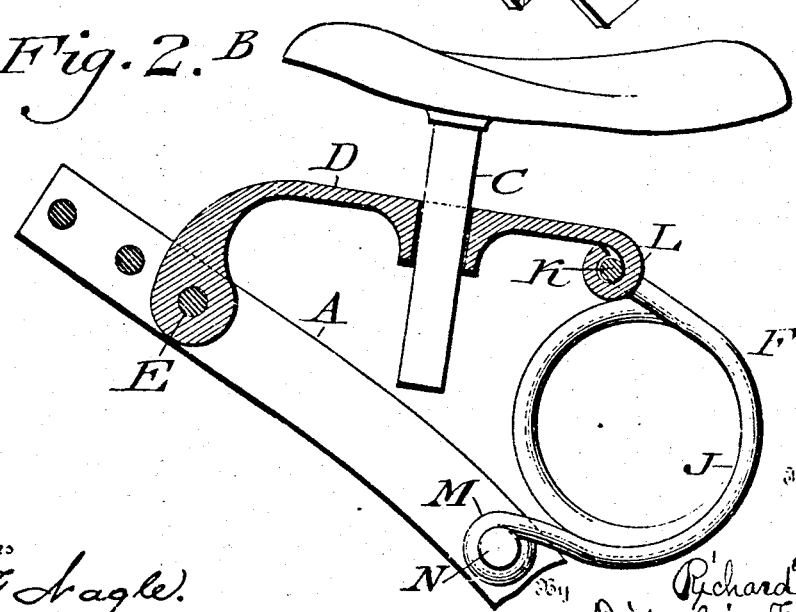

UNITED STATES PATENT OFFICE.

RICHARD G. LEDIG, OF PHILADELPHIA, PENNSYLVANIA, ASSIGNOR TO AUGUST MECKY, OF PHILADELPHIA, PENNSYLVANIA.

SEAT FOR VELOCIPEDES, &c.

No. 807,749.  Specification of Letters Patent.  Patented Dec. 19, 1905.

Application filed December 17, 1903. Serial No. 185,463.

*To all whom it may concern:*

Be it known that I, RICHARD G. LEDIG, a citizen of the United States, residing in the city and county of Philadelphia, State of Pennsylvania, have invented a new and useful Improvement in Seats for Velocipedes, &c., of which the following is a specification.

My invention consists of an improvement in the seat of a velocipede, &c., embodying a resilient support for the seat and means for vertically adjusting the same, the construction of said parts being hereinafter described, and the novel features thereof pointed out in the claims.

Figure 1 represents a perspective view of a velocipede-seat embodying my invention. Fig. 2 represents a partial side elevation and partial vertical section thereof.

Similar letters of reference indicate corresponding parts in the figures.

Referring to the drawings, A designates the reach or other suitable part of the frame of a velocipede.

B designates a seat or saddle from which depends the vertically-extending stem or post C, the latter freely entering the radial arm D, the forward end of which is pivotally mounted on the reach A, as at E, and the rear end of which is supported on the spring F, which is connected with the reach A, thus sustaining said seat.

About the vertical opening in the reach A, through which the stem C passes, is the boss or socket G, to which is fitted the screw H, the point of which is adapted to bear against the stem C and provide means for holding the seat at different heights, thus vertically adjusting said seat, it being evident that when the screw H is loosened the stem C may be raised and lowered, and with it the seat B, after which said screw is tightened, thus retaining the stem, and consequently the seat, in its adjusted position between the ends of the bar D and preserving the balance of the saddle as said bar rises and falls.

In order to connect the radial arm D with the spring F, the latter is of the form of a plurality of coils J, with the cross-bar K connecting the same, and the radial arm D has at its rear end the opening or sleeve L, which embraces said cross-bar and is formed by bending the metal of said bar upon itself, producing a transversely-extending opening which receives said cross-bar K of the springs, the walls of the eye firmly embracing said cross-bar. It will be noticed that said sleeve is broad and provides a long surface which encircles said cross-bar K, and so is practically prevented from turning thereon and imparting torsion to the same, and consequently side motions to the coils of the spring. This in a measure also relieves the pivot E of lateral strain or twisting. The ends of the spring are formed with eyes M, which embrace studs N, on the reach A, thus securing said spring to said reach, it being evident that when the seat B is occupied the load is transmitted to the spring F, and the latter thus provides the resiliency for said seat, causing it to ride easily and comfortably, as is evident. As the coils of said springs are connected at one end with the frame and coupled at the other end by the cross-bar K, said coils retain an upright position and are restrained from lateral bulging and displacement. When the seat or saddle is loaded or occupied, as the lower end of the stem is free below the arms D said end may enter between the separated members of the reach A without being limited in its descending motions by the latter and is removed from contact of the garments of the rider. As the spring contracts and expands the arm D rises and falls with the same as it turns on its pivot E. The seat thus preserves its distance at all times from the front of the reach.

It will be seen that the radial arm D is directly pivoted on the portion A of the frame and the spring F is directly connected with said frame. The socket G, which receives the post C is intermediate of the ends of said arm, thus vastly simplifying the construction of the device, while in vertically adjusting the seat it may be quickly lowered and raised simply by moving the post C to the required distance. It will also be seen that the portion of the radial arm forward of the socket G presents no material obstruction to the legs of the rider contacting therewith. Should the saddle be lowered to full extent or to a greater extent than that shown in the drawings, the stem may enter the separated members of the reach or backbone without interference therewith. It will also be seen that the radial arm is composed of a single bar containing within itself the horizontal opening for the pivot E, the vertical opening for the post C, the horizontal opening for the screw H, and the integrally-formed horizontally-arranged sleeve for the cross-bar K of the spring, thus simplifying the construction of said arm and rendering it strong and durable and adapted to move true on the spring without material liability of imparting lateral motions to the latter.

Having thus described my invention, what I claim as new, and desire to secure by Letters Patent, is—

1. In a seat of the character stated, a reach, a spring adapted to be connected with said reach and provided with a cross-bar, a radial arm formed of a single bar having means for pivotal connection with said reach, means for vertically adjusting a saddle thereon and a sleeve formed of the material of said arm bent on itself and embracing said cross-bar.

2. In a seat of the character stated, a reach, a saddle having a depending post and a radial arm and a spring, the latter being provided with a cross-bar and adapted to be connected with said reach, said arm being pivotally mounted at one end on said reach and supported on the other end on said spring, said bar having a vertical opening through which said depending post is adjustably passed, a horizontal opening, a screw in the latter-named opening adapted to engage said post and a horizontally-arranged sleeve at the other end of the arm formed of the material of the same bent on itself and embracing said cross-bar.

RICHARD G. LEDIG.

Witnesses:
JOHN A. WIEDERSHEIM,
C. D. McVAY.